United States Patent [19]

Dawes et al.

[11] Patent Number: 4,740,377

[45] Date of Patent: Apr. 26, 1988

[54] METHOD FOR MICROWAVE COOKING OF FOODS

[75] Inventors: David H. Dawes, Westbrooke; Eldon L. Fletcher, Kingston, both of Canada

[73] Assignee: Du Pont Canada Inc., Mississauga, Canada

[21] Appl. No.: 945,509

[22] Filed: Dec. 23, 1986

[30] Foreign Application Priority Data

Dec. 31, 1985 [GB] United Kingdom ............... 85031934

[51] Int. Cl.$^4$ .......................... A23L 1/01; B65B 29/08
[52] U.S. Cl. .................................... 426/234; 426/243; 426/241
[58] Field of Search ............... 426/107, 113, 234, 243, 426/241; 219/10.55 E, 10.55 M

[56] References Cited

U.S. PATENT DOCUMENTS

| | | | |
|---|---|---|---|
| 4,013,798 | 3/1977 | Goltsos | 426/234 |
| 4,351,997 | 9/1982 | Mattisson et al. | 426/234 |
| 4,390,555 | 6/1983 | Levinson | 426/234 |
| 4,398,077 | 8/1983 | Freedman | 426/243 |
| 4,486,640 | 12/1984 | Bowen et al. | 426/243 |
| 4,585,823 | 4/1986 | Saito et al. | 524/600 |
| 4,641,005 | 2/1987 | Seiferth et al. | 426/243 |

FOREIGN PATENT DOCUMENTS

| | | |
|---|---|---|
| 1019867 | 10/1977 | Canada . |
| 1022356 | 12/1977 | Canada . |
| 1193400 | 9/1985 | Canada . |

*Primary Examiner*—Steven Weinstein

[57] ABSTRACT

The present invention provides a method for heating food comprising heating in a microwave oven for at least 2 minutes a food package which comprises food placed in an injection moulded food container, made from a partially crystalline polyamide, optionally containing a compatibilized olefin-based polymer and/or a filler. The food container has wall and floor thicknesses of 1.6 mm or less.

25 Claims, No Drawings

METHOD FOR MICROWAVE COOKING OF FOODS

The present invention relates to an ovenable container, e.g., a tray. Ovenable trays are used in the prepackaged food industry. Usually food is placed on such trays, the trays are lidded and the lidded trays are placed in food refrigerators or freezers.

It is known to sell foods, e.g. meals, in lidded trays, to consumers with the intention that the food in the lidded trays may be heated or cooked in a conventional, convection oven or a microwave oven. Such trays are often known in the trade as dual-ovenable trays. Most commonly such dual-ovenable trays are made by thermoforming sheets of crystallizable polyethylene terephthalate. Polyethylene terephthalate has been used for manufacture of dual ovenable trays because of its high melting point.

Canadian Pat. No. 1 022 356 to Duffield et al, which issued Dec. 13, 1977, discloses a method of continuous melt thermoforming thermoplastic polymers to form substantially inflexible open containers, e.g., pie plates, trays. Such polymers include polyamides, ethylene polymers, acetals, polycarbonates, polysulphones and polyacrylates. Polyamides, e.g., nylon 6 and nylon 66 are indicated as being preferred, especially those having a relative viscosity in the range of about 25 to 65. The containers are disclosed as having a thickness in the range of 2 to 30 mils (0.05 to 0.75 mm). It is further disclosed that the thermoplastic polymers may contain additives, e.g., stabilizers, pigments, fillers and/or nucleating agents. Fillers especially useful for polyamides are disclosed as being calcium carbonate, calcium silicate, kaolin, calcined kaolin, aluminium silicate, magnesium silicate, talc, silica and silane-treated silica and silicate fillers, particularly in amounts of 20–60 wt % of the fillers.

It is known that thermoforming processes may waste up to 40% of the feedstock. Such waste must either be recycled, scrapped or sold for some other end use. Thermoformed trays tend to be nonuniform in thickness, particularly at corners in the tray. This nonuniformity often leads to physical weaknesses in the tray or causes the other parts of the tray to be unnecessarily thick. While it is recognized that injection moulding processes would overcome such difficulties, commercially it has not been found possible to injection mould trays with sufficiently thin walls from polyethylene terephthalate and for reasons which will be explained later, it has not been thought possible to use polyamides for microwave applications.

Canadian Pat. No. 1 019 867 to D. H. Dawes, which issued Oct. 25, 1977 relates to compositions of polyamides and alumina lakes. It is disclosed that articles may be formed by extrusion or injection moulding of such compositions. The continuous melt thermoforming process of Canadian Pat. No. 1 022 356 is exemplified. It is also disclosed that such compositions may also contain fillers, stabilizers and the like. Copper salts and wollastonite are exemplified.

Canadian Pat. No. 1 193 400 to R. A. Zelonka, which issued Sept. 10, 1985 relates to a foamable polyamide composition comprising 0.2 to 10 parts by weight of zinc, iron or copper carbonates per 100 parts of polyamide. Preferred polyamides have a relative viscosity of 25 to 65, although those with relative viscosities of up to at least 250 may be used. Such compositions may be extruded by known methods, including injection moulding and continuous melt thermoforming processes. It is also disclosed that fillers, e.g., wollastonite, talc, mica, in amounts up to about 40 wt %, and nucleating agents, e.g., silica, calcium silicate, may be added to the composition. The examples show foamed melt thermoformed pie plates having thicknesses of from 0.41 to 0.89 mm.

U.S. Pat. No. 4,585,823 to Saito et al, which issued Aug. 29, 1986, discloses microwavable ovenware moulded from wholly aromatic polyester. It is indicated that thermal resistance, stiffness and mould shrinkage of resins are generally improved by blending the resin with a fibrous reinforcing agent, e.g., glass fibre, carbon fibres, or powder- or slice-form inorganic filler, e.g., calcium carbonate, magnesium carbonate, aluminium hydroxide, glass beads, titanium dioxide, mica, molybdenum disulphide, graphite. It is disclosed that addition of talc and rutile-type titanium dioxide in certain aromatic polyesters caused a large reduction in mechanical strength but such a drawback may be mitigated by the addition of wollastonite and titanium dioxide to the aromatic polyester.

Because of the recent rapid acceptance of microwave ovens, the demand for thermoformed crystallized polyethylene terephthalate trays has grown dramatically, partly because of its technical, aesthetic and cost advantages compared to, for example, microwavable trays of coated paperboard or thermoset polymers. For dual ovenable trays, it is also important for the trays to withstand temperatures of up to about 230° C. without softening or warping and down to about −40° C. without breaking while being handled or transported. It is known that polyamides absorb microwave energy and rapidly become hot upon the continued application of such energy. In addition, the dielectric loss factor increases dramatically as the temperature of the polyamide is raised. As a result, it has heretofore been believed by those skilled in the art that polyamides suitable for the manufacture of trays which may be heated in conventional ovens are unsuitable for more than minimal heating in microwave ovens because absorption of microwave energy would cause softening or melting. It will be noted, for example, in Example IV of Canadian Pat. No. 1 022 356 that melt thermoformed trays of nylon 66, wollastonite, ferric oxide and cupric stearate, containing a frozen food, became hot when heated in a microwave oven for only 20 seconds. Completion of cooking of the food then took place in a conventional oven at 227° C. for 20 minutes. Although the disclosure is silent on the point, the example seems to confirm the belief that such polyamide trays cannot withstand microwave energy sufficient to cook the food. Furthermore, in other experiments, 2 and 3 mm thick injection moulded disks of 60 wt % nylon 66 and 40 wt % wollastonite, when heated for 10 minutes in a 625 watt Sanyo (trade mark) microwave oven showed severe melting, degradation or charring. A further disadvantage of polyamide trays made using the melt thermoforming process of Canadian Pat. No. 1 022 356 is that they tend to crack or break under impact at low temperatures, e.g., at −20° C., and tend to distort at oven temperatures, e.g., 225° C.

It has now been found, however, that food contained in a an injection moulded container made from a partially crystalline polyamide may be heated in a microwave oven for a sufficient time to heat or cook such food provided that the thickness of the container is 1.6 mm or less.

Accordingly, the present invention provides a method for heating food comprising heating in a microwave oven for at least 2 minutes a food package which comprises said food placed in an injection moulded food container which has been made from a partially crystalline polyamide and has a floor and walls attached thereto, said floor and walls having substantially the same thickness, said thickness 1.6 mm or less.

In a preferred embodiment the polyamide is selected from nylon 6 and nylon 66. Nylon 6 having an intrinsic viscosity (IV) in the range of 0.75 to 1.3 dl/g, is useful. It is preferred that the intrinsic viscosity be in the range of 0.95 to 1.2 dl/g, particularly 1.0 to 1.1 dl/g. Intrinsic viscosity is measured at 25° C. in formic acid (85% acid to 15% water) by methods known in the art. An especially preferred polyamide is nylon 66 having a relative viscosity (RV) in the range of 25 to 250, particularly 40 to 85 and more particularly 45–60. Relative viscosity as shown herein is the ratio of viscosity at 25° C. of an 8.4 wt % solution of nylon 66 in 90 wt % formic acid (90% acid to 10% water) to the viscosity at 25° C. of the 90 wt % formic acid alone. The polyamide may be a blend of polyamides, e.g., nylon 66 having a relative viscosity of 50 and nylon 66 having a relative viscosity of 200. The polyamide may also be a blend of different polyamides, e.g., nylon 6 and nylon 66.

In another embodiment the polyamide of the container may also be blended with a modifying material selected from the group consisting of fillers, pigments, dyes and mixtures thereof. The polyamide may also contain small quantities of antioxidants, thermal stabilizers, lubricants, release agents, flow modifiers and the like. The specific modifying material chosen will depend on the end-use requirements.

Olefin-based polymer modifying materials tend to make the containers flexible and tough, and more suitable for microwave applications. The compatibilized olefin-based polymers may be olefin-based polymers having polar groups attached thereto which allow the olefin-based polymer and the polyamide to be blended without phase separation. Such compatibilized olefin-based polymers may be in the form of so-called graft copolymers. The compatibilized olefin-based polymers may also be mixtures of compatibilized olefin-based polymers and olefin-based polymers which are incompatible with the polyamide. Examples of such incompatible polymers include homopolymers of ethylene or propylene, copolymers of ethylene and $C_4$ to $C_{10}$ alpha-olefins, polyisobutylene and poly(4-methylpentene-1). Examples of compatibilized olefin-based polymers include copolymers of ethylene and unsaturated carboxylic acid or ester monomers, e.g., ethylene/vinyl acetate copolymers, ethylene/methylacrylate polymers, ethylene/acrylate copolymers ethylene/n-butylacrylate copolymers, ethylene/methacrylate copolymers, ethylene/methacrylic acid copolymers and partially neutralized ethylene/methacrylic acid copolymers (ionomers); hydrocarbon alpha-olefins grafted with unsaturated carboxylic acids or unsaturated anhydrides, e.g., ethylene/acrylate ester copolymers grafted with unsaturated carboxylic acids or unsaturated anhydrides, ethylene/vinyl acetate copolymers grafted with unsaturated carboxylic acids or unsaturated anhydrides, ethylene/$C_4$ to $C_{10}$ alpha-olefin copolymers grafted with unsaturated carboxylic acids or unsaturated anhydrides, ethylene homopolymers grafted with unsaturated carboxylic acids or anhydrides. The preferred unsaturated carboxylic acid or unsaturated anhydride are maleic acid and maleic anhydride. As indicated hereinbefore, such polyolefin materials must, of course, be compatible with the partially crystalline polyamides useful in this invention.

Useful concentrations of such olefin-based polymer modifying materials fall within the range of 1–30 wt % of the blend, with 10–20 wt % being preferred. Many of the olefin-based polymer modifying materials may be added to improve the toughness of the containers particularly at low temperatures, e.g., polyethylene grafted with maleic anhydride, or to improve impact resistance, e.g., ethylene/methacrylic acid copolymers. With incompatible olefin-based polymers, it is necessary to also add small quantities of a compatibilized olefin-based polymer. For example, small amounts of ionomer, e.g., up to about 5 wt % of the blend, in order to assist in compatibilizing the polyolefin and polyamide. For convenience, however, a graft copolymer as the sole compatibilized olefin-based polymer is preferred.

Ionomer modifying materials in amounts of 1–30 wt % of the blend tend to make the injection moulded containers flexible and tough, properties which are especially important at low temperatures. Zinc ionomers are preferred. However, at high temperatures, e.g., about 230° C., such containers tend to become less rigid and hence they tend to be more suitable for microwave cooking or lower temperature cooking in conventional ovens. Stiffness of such ionomer-modified containers may be improved by addition of inorganic mineral or siliceous fillers, e.g., talc, glass bubbles, kaolin and mica.

Suitable fillers include fibrous inorganic fillers, e.g., glass fibres; fibrous organic fillers, e.g., aramid fibres; powdered fillers, e.g., kaolin, fused quartz, calcium carbonate; siliceous filler, e.g., glass beads, hollow glass spheres; platy fillers, e.g., talc, mica. The platy fillers are much preferred because they substantially improve the heat distortion characteristics of the injection moulded containers. The platy filler particles should preferably have a largest dimension (hereinafter referred to as "diameter") of less than about 150 μm and a minimum particle diameter to particle thickness ratio (otherwise referred to as the aspect ratio) of about 20:1. It is preferable that the aspect ratio be as large as practical, e.g., as large as 50:1 to 100:1. Wet ground mica is the preferred filler, having a mesh size between 60 and 325 U.S. sieve, particularly between 200 and 325 U.S. sieve. Suitable grades of mica are sold under the trade marks Alsibronz 12 and Huber WG-1. Talc is preferred for light-coloured containers. The fillers may be added in amounts of 1 to 40 wt % of the blend, preferably in amounts of 10 to 30 wt %.

In addition, pigments or dyes may be added for aesthetic effect. In particular, titanium dioxide may be added for opacity. Other pigments may be added for their colour appeal. Antioxidants, e.g., 1,3,5-trimethyl-2,4,6-tris(3,5-di-tertbutyl-4-hydroxyphenyl)benzene, heat stabilizers, e.g., copper salts, processing aids and the like may also be added as are known in the art.

It is also preferred that the container thickness be in the range of 0.38 to 0.90 mm. The container may have stiffening ribs along the floor of the container provided that the thickness of the ribs does not exceed 1.6 mm.

The container may also have a peripheral shaped lip, the purpose of which is to provide a means for attaching a lid to the container and/or to stiffen the container. Attachment of the lid may be by mechanical means, e.g., crimping, or by other means, e.g., adhesive attachment. The peripheral shaped lip, if present, may be thicker than other parts of the tray but must not exceed 1.6 mm in thickness. The shape of the lip may be any one of known forms. The container may also be compartmentalized in order to separate different kinds of food, for example in a two-compartment container, meat may be in one compartment and vegetables in the other. The compartments may be formed using walls within the container. Alternatively, the container may be formed in such a way that each compartment is, in itself, a container and adjacent compartments are joined only at the lip of the walls of the container. The latter construction of the container is more expensive to produce because, in essence, there are two walls between adjacent compartments rather than one, as in the former construction.

The container is preferably tray-shaped, i.e., with relatively shallow walls compared to the surface area of the floor of the container.

The container may be injection moulded by known methods. It will be appreciated by those skilled in the art that it is structurally advantageous for the floor and walls of the container to be joined smoothly, with "curved corners".

The selection of thickness of the container depends in part upon the size of the container and in part upon the composition of the material from which the container is injection moulded. Merely from a structural standpoint, it will be clear that, for a given composition and container design, the thicker the container the stiffer and tougher will be the tray. It will also be appreciated, however, that the thicker the container the heavier and more costly to produce it will be.

For foods which have been refrigerated or frozen, it is usual that the container have a lid thereon, although in the microwave oven the lid should normally be perforated to allow steam to escape in a controlled manner. Several types of lids are known where the food is substantially contained between the wall's lip and the floor of the tray. Such lids may be cardboard, a film or a foil. When the food sits proud of the wall's lip, the lid may have a dome. Examples of lids include aluminium foil, nylon film and injection moulded 4-methyl-pentene polymer domed lids.

It is preferred that the trays be injection moulded from previously melt-blended polyamide and modifying materials. Some additives may be added more conveniently in the injection moulding process, e.g., colorants.

After injection moulding, the containers are filled with food. Most often, the food consists of an entree comprising meat and one or more vegetables. The food-filled containers may then be lidded in a conventional manner and the resultant package either refrigerated or frozen. The thus-cooled food package is transported to grocery shops, supermarkets, or the like for storage and display in freezer or refrigerator cabinets. The food-filled trays may also be lidded in an inert atmosphere, so that an inert atmosphere remains in the package. Such food packages may be stored unfrozen or in unrefrigerated form. After sale, the consumer may cook the food in a conventional oven or microwave oven, usually after removing or perforating the lid. The required heating or cooking time may be found by simple experimentation. For example, in order to reheat precooked, refrigerated foods, it may take 2 minutes or more per food serving; in order to cook frozen foods, it may take 5-10 minutes per food serving.

The present invention may be illustrated by the following examples:

EXAMPLE 1

In order to demonstrate whether trays could be injection moulded using a number of polymers, the following experiments were performed. Trays, 0.76 mm thick and approximately 21 cm by 14 cm wide by 2.0 cm deep were injection moulded using a Battenfeld (trade mark) BK 1300-1400, 150 ton injection moulding machine. The processing conditions varied from 280°-315° C. barrel temperature, 35°-95° C. mould temperature and 34.5-137.9 MPa injection pressure, depending upon the materials being injection moulded.

Polyethylene terephthalate trays could not be successfully injection moulded because the crystallization process was too slow for commercial application.

While polymethylpentene trays could be injection moulded, they tended to warp and showed low rigidity when hot even when the polymethylpentene was mixed with siliceous fillers.

The polyethylene terephthalate and polymethylpentene compositions are not useful in the present invention.

Nylon 66, blended with up to about 20 wt % ionomer polymers moulded well. The trays performed well in microwave ovens, at 625 watts for 10 minutes, when the trays were filled with frozen food and lidded, or when the trays were filled with water and lidded.

Nylon 66 and uncompatibilized polymethylpentene blends could be moulded but there was phase separation of the polymers.

Nylon 66, blended with 40 wt % wollastonite filler, moulded well and also performed well in microwave ovens, at 625 watts for 10 minutes, when the trays were filled with water or food and lidded.

EXAMPLE 2

In order to show the effect of wall thickness, injection moulded disks were prepared, of 0.81, 2.03 and 3.05 mm in thickness and 10 cm in diameter. The disks were subjected to "HI" heat, 625 watts for 10 minutes in a Sanyo (trade mark) microwave oven. Disks of nylon 66 blended with 40 wt % wollastonite, of 2.03 and 3.05 mm thickness, showed severe melting or burning or degradation, while disks of 0.81 mm thickness were unaffected.

EXAMPLE 3

Trays having 0.76 and 1.52 mm thicknesses were prepared and tested in a similar manner to those in Example 1. The trays were filled with water or baked beans and tested in a 625 watt Sanyo microwave oven. The results of such tests were as follows:

| Material | Thickness (mm) | "Food" | 15 mins at "HI" microwave heat |
|---|---|---|---|
| nylon 66 + 40 wt % wollastonite | 0.76 | water | OK |
| | 1.52 | water | tray melted |
| | 0.76 | baked beans | OK |
| | 1.52 | baked beans | OK |
| nylon 66 + 40 wt % hollow glass spheres | 0.76 | water | OK |
| | 1.52 | water | tray melted |
| | 0.76 | baked beans | OK |
| | 1.52 | baked beans | OK |
| nylon 66 (ZYTEL 101) (trade mark) | 0.76 | water | OK |
| | 1.52 | water | OK |

In further experiments it was noted that the trays made from a mixture of nylon 66 and hollow glass spheres were more easily melted in a microwave oven than trays made solely from nylon 66. They were functional, however.

EXAMPLE 4

Trays, 1.0 mm thick, about 20.3 cm in diameter and 1.5 cm deep were injection moulded under conditions similar to those indicated in Examples 1. The compositions of the trays were as follows:

A. 99 wt % nylon 66 having an RV of 100 and 1 wt % 1,3,5-trimethyl-2,4,6-tris(3,5-di-tert-butyl-4-hydroxybenzyl benzene antioxidant.

B. 78.80 wt % nylon 66 having an RV of 48, 19.67 wt % maleic anhydride grafted polyethylene (wherein the polyethylene had a density of 0.92 g/cm$^3$ and a melt index of 1.4 dg/min before grafting), 0.5 wt % of the antioxidant of composition A, 1 wt % titanium dioxide pigment and 0.03 wt % ultramarine blue pigment.

C. 72 wt % nylon 66 having an RV of 48, 25 wt % 325 U.S. sieve muscovite wet ground mica and 3 wt % titanium dioxide pigment.

D. 68.8 wt % nylon 66 having an RV of 42, 30 wt % montana talc having an average particle size of 1.6 μm with a largest size of 12 μm, 0.2 wt % zinc stearate and 1.0 wt % carbon black pigment.

E. 81 wt % nylon 66 having an RV of 60, 18 wt % of a copolymer of 85 wt % ethylene and 15 wt % methacrylic acid, 59% neutralized with sodium ions (sodium ionomer) and having a melt index of 0.9 dg/min, and 1 wt % of a pigment comprising titanium dioxide and a yellow metal oxide pigment.

F. 68.6 wt % nylon 66 having an RV of 48, 17.4 wt % of a copolymer of 90 wt % ethylene and 10 wt % methacrylic acid, 71% neutralized with zinc ions (zinc ionomer) and having a melt index of 1.1 dg/min, 13 wt % glass fibres coated with 0.5 wt % alpha aminopropyltriethoxysilane (based upon the weight of glass) and 1 wt % titanium dioxide pigment.

Trays of compositions A to F were taken and filled with about 340 g of food in the form of meat, vegetables and rice, lidded with alumninium foil and frozen at −20° C. for 24 h. The frozen food, thus packaged was then cooked in a conventional Kenmore (trade mark) convection oven at 200° C. for 40 minutes. All of the trays performed well in such tests. Further samples of trays of compositions A to F were similarly filled with food and lidded with aluminium foil and the food frozen at −20° C. for 24 h. The foil was then removed and the tray relidded with a moulded polyethylene domed lid with vent-holes therein. The thus-packaged food was cooked at 625 watts in a Sanyo microwave oven for 7 minutes. All of the trays performed well in such tests, the food being adequately cooked.

We claim:

1. A method for heating food comprising heating in a microwave oven for at least 2 minutes a food package which comprises said food placed in an injection moulded food container which has been made from a partially crystalline polyamide and has a floor and walls attached thereto, said floor and walls having substantially the same thickness, said thickness being up to 1.6 mm.

2. A method according to claim 1 wherein the crystalline polyamide is nylon 6 or nylon 66.

3. A method according to claim 2 wherein the partially crystalline polyamide contains a filler in an amount of 1 to 40 wt % of the filled polyamide.

4. A method according to claim 2 wherein the container has been made from a blend of a partially crystalline polyamide and a compatibilized olefin-based polymer in an amount of from 1 to 30 wt % of the blend.

5. A method according to claim 4 wherein the compatibilized olefin-based polymer is selected from
 (i) copolymers of ethylene and unsaturated carboxylic acid or unsaturated ester monomers, and
 (ii) hydrocarbon alpha-olefins grafted with unsaturated carboxylic acids or unsaturated anhydrides.

6. A method according to claim 5 wherein the compatibilized olefin-based polymer is selected from ethylene/vinyl acetate copolymers, ethylene/methylacrylate copolymers, ethylene/ethalacrylate copolymers, ethylene/n-butylacrylate copolymers, ethylene/methacrylate copolymers, ethylene/methacrylic acid copolymers, partially neutralized ethylene/methacrylic acid copolymers, ethylene/acrylate ester copolymers grafted with unsaturated carboxylic acids or unsaturated anhydrides, ethylene/vinyl acetate copolymers grafted with unsaturated carboxylic acids or unsaturated anhydrides, ethylene/C$_4$ to C$_{10}$ alpha-olefin copolymers grafted with unsaturated carboxylic acids or unsaturated anhydrides, and ethleyne homopolymers grafted with unsaturated carboxylic acids or anhydrides.

7. A method according to claim 6 wherein the compatibilized olefin-based polymer is in an amount of 10-20 wt % of the blend.

8. A method according to claim 2 wherein the container has been made from a blend of a partially crystalline polyamide and a compatibilized olefin-based polymer in an amount of from 1 to 30 wt % of the blend, and additionally containing a filler in an amount of 1 to 40 wt % of the blend.

9. A method according to claim 1 wherein the crystalline polyamide is nylon 66 having an RV of from 25 to 250.

10. A method according to claim 9 wherein the partially crystalline polyamide contains a filler in an amount of 1 to 40 wt % of the filled polyamide.

11. A method according to claim 9 wherein the container has been made from a blend of a partially crystalline polyamide and a compatibilized olefin-based polymer in an amount of from 1 to 30 wt % of the blend.

12. A method according to claim 11 wherein the compatibilized olefin-based polymer is selected from
 (i) copolymers of ethylene and unsaturated carboxylic acid or unsaturated ester monomers, and
 (ii) hydrocarbon alpha-olefins grafted with unsaturated carboxylic acids or unsaturated anhydrides.

13. A method according to claim 12 wherein the compatibilized olefin-based polymer is selected from ethylene/vinyl acetate copolymers, ethylene/methylacrylate copolymers, ethylene/ethylacrylate copolymers, ethylene/n-butylacrylate copolymers, ethylene/methacrylate copolymers, ethylene/methacrylic acid copolymers, partially neutralized ethylene/methacrylic acid copolymers, ethylene/acrylate ester copolymers grafted with unsaturated carboxylic acids or unsaturated anhydrides, ethylene/vinyl acetate copolymers grafted with unsaturated carboxylic acids or unsaturated anhydrides, ethylene/C$_4$ to C$_{10}$ alpha-olefin copolymers grafted with unsaturated carboxylic acids or unsaturated anhydrides, and ethylene homopolymers grafted with unsaturated carboxylic acids or unsaturated anhydrides.

14. A method according to claim 13 wherein the compatibilized olefin-based polymer is in an amount of 10–20 wt % of the blend.

15. A method according to claim 9 wherein the container has been made from a blend of a partially crystalline polyamide and a compatibilized olefin-based polymer in an amount of from 1 to 30 wt % of the blend, and additionally containing a filler in an amount of 1 to 40 wt % of the blend.

16. A method according to claim 1 wherein the partially crystalline polyamide contains a filler in an amount of 40 wt % of the filled polyamide.

17. A method according to claim 16, 5 or 6 wherein the filler is an amount of 10 to 30 wt %.

18. A method according to claim 16, 3 or 10 wherein the filler is talc or mica in an amount of 10 to 40 wt %.

19. A method according to claim 1 wherein the container has been made from a blend of a partially crystalline polyamide and a compatibilized olefin-based polymer in an amount of from 1 to 30 wt % of the blend.

20. A method according to claim 19 wherein the compatibilized olefin-based polymer is selected from
  (i) copolymers of ethylene and unsaturated carboxylic acid or unsaturated ester monomers, and
  (ii) hydrocarbon alpha-olefins grafted with unsaturated carboxylic acids or unsaturated anhydrides.

21. A method according to claim 20 wherein the compatibilized olefin-based polymer is selected from ethylene/vinyl acetate copolymers, ethylene/methylacrylate copolymers, ethylene/ethylacrylate copolymers, ethylene/n-butylacrylate copolymers, ethylene/methacrylate copolymers, ethylene/methacrylic acid copolymers, partially neutralized ethylene/methacrylic acid copolymers, ethylene/acrylate ester copolymers grafted with unsaturated carboxylic acids or unsaturated anhydrides, ethylene/vinyl acetate copolymers grafted with unsaturated carboxylic acids or unsaturated anhydrides, ethylene/$C_4$ to $C_{10}$ alpha-olefin copolymers grafted with unsaturated carboxylic acids or unsaturated anhydrides, and ethylene homopolymers grafted with unsaturated carboxylic acids or unsaturated anhydrides.

22. A method according to claim 21 wherein the compatibilized olefin-based polymer is in an amount of 10–20 wt % of the blend.

23. A method according to claim 1 wherein the container has been made from a blend of a partially crystalline polyamide and a compatibilized olefin-based polymer in an amount of from 1 to 30 wt % of the blend, and additionally containing a filler in an amount of 1 to 40 wt % of the blend.

24. A method according to claim 23, 8 or 15 wherein the filler is in an amount of 10 to 30 wt %.

25. A method according to claims 23, 8 or 15 wherein the filler is mica or talc in an amount of 10 to 40 wt. %.

* * * * *